United States Patent
Lucero

(10) Patent No.: US 9,290,224 B2
(45) Date of Patent: Mar. 22, 2016

(54) PROTECTIVE COVER FOR CYCLIST

(71) Applicant: Telesfor Lucero, Littleton, CO (US)

(72) Inventor: Telesfor Lucero, Littleton, CO (US)

(*) Notice: Subject to any disclaimer, the term of this patent is extended or adjusted under 35 U.S.C. 154(b) by 2 days.

(21) Appl. No.: 14/078,779

(22) Filed: Nov. 13, 2013

(65) Prior Publication Data
US 2015/0129006 A1    May 14, 2015

(51) Int. Cl.
*B62J 17/08*    (2006.01)

(52) U.S. Cl.
CPC ...................................... *B62J 17/08* (2013.01)

(58) Field of Classification Search
CPC ......... B62J 17/065; B62J 17/08; B62J 17/083
USPC ................ 296/136.12, 100.11, 95.1; 114/361
See application file for complete search history.

(56) References Cited

U.S. PATENT DOCUMENTS

| | | | | |
|---|---|---|---|---|
| 3,223,098 | A * | 12/1965 | Dole, Jr. ........................ | 135/126 |
| 4,352,362 | A * | 10/1982 | Nichols ........................... | 135/98 |
| 4,706,696 | A * | 11/1987 | Gillis ............................ | 135/127 |
| 4,827,958 | A * | 5/1989 | Cantwell et al. .............. | 135/127 |
| 5,072,694 | A * | 12/1991 | Haynes et al. ................ | 119/482 |
| 5,333,634 | A * | 8/1994 | Taylor ............................ | 135/98 |
| 5,628,336 | A * | 5/1997 | Lee ............................... | 135/114 |
| 5,884,646 | A * | 3/1999 | Ju ................................. | 135/135 |
| 5,927,311 | A * | 7/1999 | Jager ............................. | 135/124 |
| 6,199,572 | B1 * | 3/2001 | Rousselle et al. ............. | 135/128 |
| 6,345,639 | B2 * | 2/2002 | Rousselle et al. ............. | 135/128 |
| 6,394,528 | B2 * | 5/2002 | Hoenack ................... | 296/136.01 |
| 6,725,871 | B1 * | 4/2004 | Shearer et al. ............. | 135/88.01 |
| 7,013,904 | B2 * | 3/2006 | Kofler .......................... | 135/132 |
| 7,172,234 | B2 * | 2/2007 | Chang ........................ | 296/95.1 |
| D638,777 | S * | 5/2011 | Poland et al. ................ | D12/402 |
| 8,123,274 | B1 * | 2/2012 | Edwards et al. ......... | 296/100.11 |
| 8,181,661 | B2 * | 5/2012 | Livacich et al. ............. | 135/138 |

FOREIGN PATENT DOCUMENTS

| | | | |
|---|---|---|---|
| FR | 2807001 A1 | * | 10/2001 |
| JP | 08104276 A | * | 4/1996 |
| WO | WO 03091088 A1 | * | 11/2003 |

* cited by examiner

*Primary Examiner* — Pinel Romain
(74) *Attorney, Agent, or Firm* — The Law Office of Jerry D. Haynes

(57) ABSTRACT

A protective cover for uncovered vehicles comprising a pair of poles, where the pair of poles intersect each other to create a domed structure over an uncovered vehicle; a waterproof tarp attached beneath the pair of poles; a closure in the waterproof tarp, where the closure opens the waterproof tarp; at least one window on the waterproof tarp, where the window enables a user to see through the waterproof tarp; a set of openings on pair of poles, where the set of openings anchor the pair of poles to the uncovered vehicle; and a plurality of fastening means on the pair of poles, where the plurality of fastening means fasten the waterproof tarp to the pair of poles. The protective cover provides a temporary shelter to shield the user from rain, snow and hail until the weather passes.

8 Claims, 1 Drawing Sheet

PROTECTIVE COVER FOR CYCLIST

BACKGROUND OF THE INVENTION

1. Field of the Invention

The present invention relates to a device to cover and protect bikers and motorcyclists from rain, snow and hail while they are operating their vehicles.

2. Description of Related Art

Bicycles and motorcycles are popular modes of transportation enjoyed by a wide variety of users. Most people enjoy the openness of the vehicles, not provided by traditional cars and trucks. The bicycles provide a quick and easy machine simply powered by the rider. Never requiring power or gas bicycles are convenient for use in big cities, on campuses and for sport enthusiasts. The motorcycles are also easily maneuverable and can fit into tight spaces, but don't require the exertion from the rider like operating a bike. Motorcycle riders may travel great distances in the open air, which little to no exertion required.

A problem commonly encountered by both bicycle and motorcycle riders is inclement weather. When it's raining or snowing the cyclists are prevented from riding forcing them to remain indoors. Sometimes the riders are already out when the bad weather starts drenching the rider, and potentially damaging the vehicle. The rider may try to carry an umbrella while operating the bicycle which may pose even more harmful problems to the operator than riding in the rain.

Therefore it would be beneficial in the art to provide a cover for open air vehicles to shield them when bad weather hits. It would also be desirable in the art to provide a cover that is easily portable so that the user may use the cover on more than one vehicle.

SUMMARY OF THE INVENTION

In view of the foregoing disadvantages inherent in the prior art, the general purpose of the present invention is to provide a protective cover to shield an uncovered vehicle, configured to include all of the advantages of the prior art, and to overcome the drawbacks inherent therein.

Accordingly, an object of the present invention is to provide a cover to protect a rider when operating an uncovered vehicle.

Another object of the present invention is to provide a cover which provides a clear window in the front and back through which the rider may see object in front of and behind them.

To achieve the above objects, in an aspect of the present invention, a protective cover is described comprising a pair of poles, where the pair of poles intersect each other to create a domed structure over an uncovered vehicle; a waterproof tarp attached to the pair of poles; a closure in the waterproof tarp, where the closure opens the waterproof tarp; at least one window on the waterproof tarp, where the window enables a user to see through the waterproof tarp; a set of openings on pair of poles, where the set of openings anchor the pair of poles to the uncovered vehicle; and a plurality of fastening means on the pair of poles, where the plurality of fastening means fasten the waterproof tarp to the pair of poles. The protective cover provides a temporary shelter for the user to shield them from rain, snow and hail until the weather passes.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a device to cover and protect bikers and motorcyclists from rain, snow and hail while they are operating their vehicles. The invention provides a protective cover for cyclist to envelop the rider and shield them from inclement weather. The cyclist protective cover consists of a domed structure upheld with weatherproof poles. The structure is collapsible to offer optimal portability and for use on more than one uncovered vehicle. A pair of transparent windows, one in front and one in back, may be provided on the protective cover to allow the rider to view through the domed structure. The protective cover for cyclist may be attached to the vehicle using bungee cords.

Figure 1:
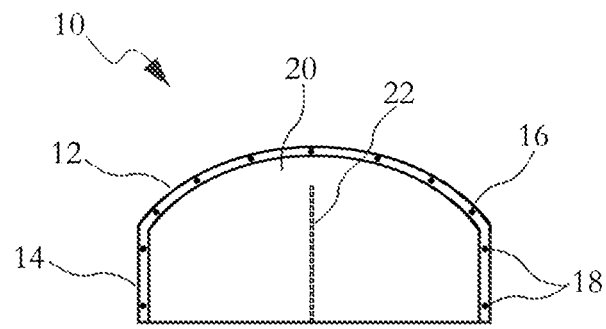
FIG. 1 depicts a side view of a protective cover for cyclist in accordance with an exemplary embodiment of the present invention.

Turning now descriptively to the drawings, referring to FIG. 1, a side view of a protective cover for cyclist 10 is shown in accordance with an exemplary embodiment of the present invention. The protective cover 10 includes a pair of poles 12 which arch over a rider on an uncovered vehicle. The pair of poles 12 intersects as they bend over the user, which is better seen and explained in reference to FIG. 3. The uncovered vehicle may be a motorcycle, a bicycle, an ATV, a tricycle, or other such vehicle where the rider is exposed to external elements.

Each pole 12 includes a pair of legs 14 which extend straight down from the domed portion of the cover 10. The pair of legs 14 may fold to collapse the pole 12 for storage. The pair of poles 12 includes a set of openings 16 above the legs 14 through which hooks on a bungee cord may be attached to anchor the protective cover 10 to the uncovered vehicle. The poles 12 may be made from a fiberglass material to further the strong, durable, lightweight and weatherproof aspects of the protective cover 12.

Under the pair of poles 12 a waterproof tarp 20 is hooked. The waterproof tarp 20 may be made from a plastic, vinyl, nylon or the like which protects the user from the external elements when beneath the protective cover 10. The waterproof tarp 20 may be transparent to enable the user to see obstacles and objects near the vehicle as they are driving. To easily open the waterproof tarp 20 is a closure 22. The closure 22 may be a zipper or hook and loop fastener. The pair of poles 12 may include a plurality of fastening means 18 to attach the waterproof tarp 20. The fastening means 18 may be holes to receive small hooks on the tarp 20, or the fastening means 18 may be snaps to easily secure the two components together.

Figure 2:
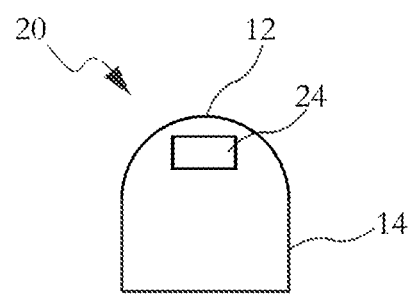
FIG. 2 depicts a front view of a protective cover for cyclist in accordance with an exemplary embodiment of the present invention.

Referring now to FIG. 2, a front view of the protective cover 10 is shown. The poles 12 create the domed appearance of the structure. The waterproof tarp 20 includes a window 24 to provide a clear viewing area through which the user can view everything in front of them. An additional window may be positioned at the back of the waterproof tarp 20, opposite the first window 24, to allow the user to see behind them. The window 24 may be incorporated into the waterproof tarp 20, and may be flexible to allow for bending when the waterproof tarp 20 is folded for storage. The dimensions of the protective cover 10 may range from 4-6 feet across and 4-7 feet tall to accommodate both children and adult users. The preferred dimensions of the protective cover 10 may be 6 feet tall and 5 feet across.

Figure 3:
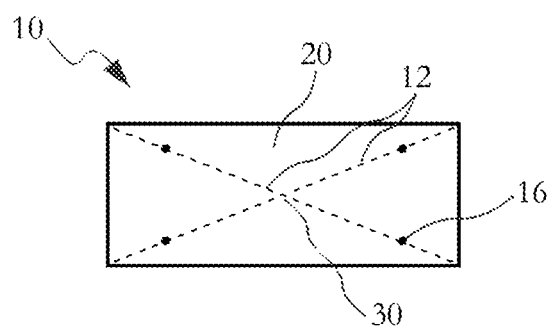
FIG. 3 depicts a top view of a protective cover for cyclist in accordance with an exemplary embodiment of the present invention.

Referring to FIG. 3, a top view of the protective cover 10 is shown. The pair of poles 12 is illustrated intersecting each other at a connection point 30. The connection point 30 may be a pivot about which the poles 12 rotate to align for storage. The connection point 30 may alternatively be a tie which fastens the pair of poles 12 together, yet allows them to still remain separate structures. The waterproof tarp 20 is attached to the entire length of the pair of poles 12. The protective cover 10 may extend 7-12 feet in length to accommodate uncovered vehicles of varying sizes. Preferably the length may be 10 feet. The openings 16 in the poles 12 are positioned at the corners of the protective cover 10 to provide all around anchoring of the poles 12 to the underlying vehicle. By utilizing the protective cover 10 the users are shielded from bad weather like rain, hail and snow. The protective cover 10 is lightweight and portable for easy setup when needed by the user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A protective cover for a cyclist comprising:
   a. a pair of poles, where the pair of poles intersect each other to create a domed structure over the cyclist;
   b. a waterproof tarp attached beneath the pair of poles, where the waterproof is attached to an entire length of the pair of poles, and said waterproof tarp creates the dome covering for the cyclist;
   c. a closure in the waterproof tarp, where the closure opens the waterproof tarp;
   d. at least one window on the waterproof tarp, where the window enables a user to see through the waterproof tarp;
   e. a set of openings on pair of poles, where the set of openings anchor the pair of poles to the cyclist; and
   f. a plurality of fastening means on the pair of poles, where the plurality of fastening means fasten the waterproof tarp to the pair of poles.

2. The protective cover according to claim 1, where each pole of the pair includes a pair of legs, where the pair of legs folds to collapse the pair of poles.

3. The protective cover according to claim 1, where the closure is a zipper.

4. The protective cover according to claim 1, where the pair of poles intersect at a connection point.

5. The protective cover according to claim 4, where the connection point is a pivot, where the pivot enables the pair of poles to collapse upon each other for storage.

6. The protective cover according to claim 4, where the connection point is a tie.

7. The protective cover according to claim 1, where the window is positioned at a front portion of the waterproof tarp.

8. The protective cover according to claim 7, where an additional window is positioned at a back portion of the waterproof tarp.

* * * * *